Aug. 7, 1928.
C. H. WHITE
TRASH CLEANER
Filed Aug. 4, 1927
1,680,031
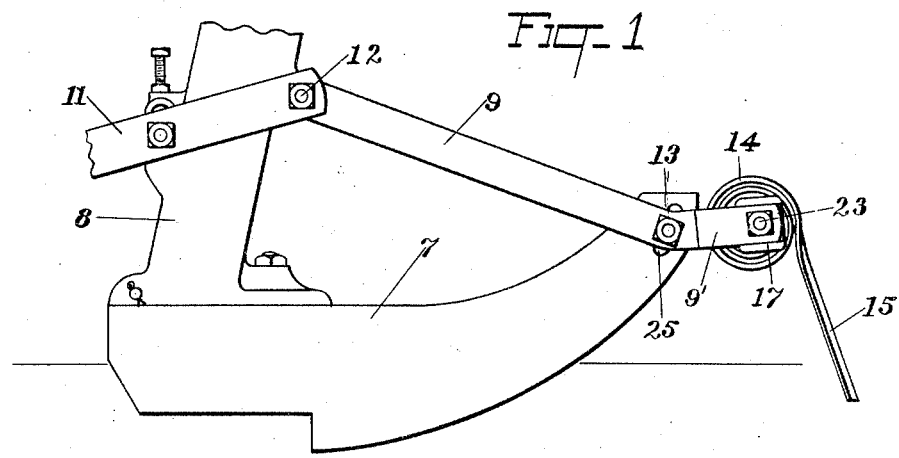
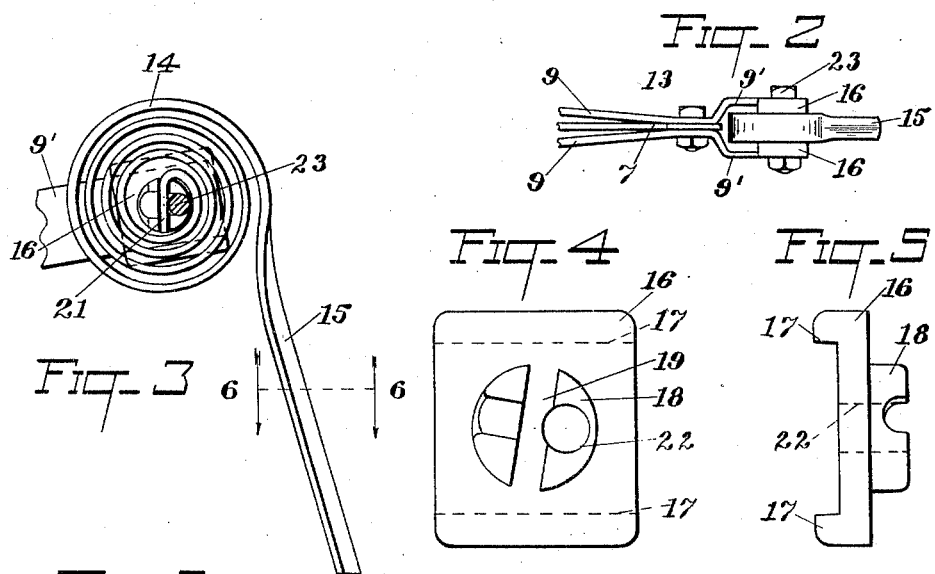
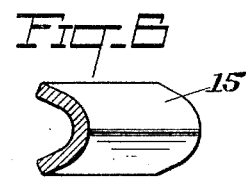

Patented Aug. 7, 1928.

1,680,031

UNITED STATES PATENT OFFICE.

CHARLES H. WHITE, OF MOLINE, ILLINOIS, ASSIGNOR TO DEERE & COMPANY, OF MOLINE, ILLINOIS, A CORPORATION OF ILLINOIS.

TRASH CLEANER.

Application filed August 4, 1927. Serial No. 210,508.

This invention relates to trash cleaners of the type frequently employed on planting implements for turning aside such trash as weeds, roots, corn stalks, and the like, in advance of the runner or other device which opens the seed furrow. These trash cleaners thus serve to prevent the accumulation of trash at the cutting edge of the furrow opener, and, in very trashy soils, are of great benefit for preventing the furrow opener from being forced out of the ground, or the trash from being forced down into the seed furrow.

The present invention is concerned with an improved construction of trash cleaner of the spring type, which has a characteristic vibrating motion as it is forced through the soil, for more effectively turning aside the trash in advance of the furrow opener. The invention is also concerned with an improved mounting of the trash cleaner on the front end of the furrow opener. The particular features of the invention will appear in detail in the following description of a preferred embodiment thereof. In the drawing accompanying this description:

Figure 1 is a fragmentary side elevation view of a planter runner, illustrating the mounting of the present trash cleaner thereon.

Figure 2 is a fragmentary plan view, illustrating the front portion of the furrow opener with the trash cleaner mounted thereon.

Figure 3 is a longitudinal sectional view, taken just inside one of the supporting arms and illustrating the mounting of the spring between such arms.

Figures 4 and 5 are elevational and end views respectively of one of the mounting blocks, and Figure 6 is a cross-sectional view through the lower end of the trash cleaner taken on the plane of line 6—6 of Figure 3.

Referring to Figure 1, I have illustrated a conventional type of furrow opener at 7, typical of the element which opens the seed furrow in a conventional type of planter. My invention has particular application to furrow openers of the runner type, and accordingly I have illustrated the same in such embodiment, but it will be understood that the invention is also applicable to other types of furrow openers. The rear end of the runner is secured to a runner shank 8 extending down from the frame of the implement, to which the shank has any suitable attachment. This runner shank is usually provided with a seed passage-way extending therethrough, for dropping the seed into the furrow opened by the runner, as is well known. The upwardly curved front end of the runner 7 is usually braced by a pair of brace bars 9 extending between the end of the runner and any suitable point of the implement frame. The members 11 are representative of a portion of such frame, the rear ends of brace bars 9 being bolted thereto as indicated at 12, and the front ends of such brace bars being rigidly secured to the front end of the furrow opener by the bolt 13.

As previously remarked, the present trash cleaner is of the spring type, and is adapted to be mounted in advance of the furrow opener where it has a characteristic vibrating motion in its engagement with the soil, for turning aside any trash in advance of the furrow opener. Such trash cleaner consists of a spiral spring 14 which is coiled from ordinary flat bar stock. The inner convolution of such spring is anchored to the implement and the outer convolution is arranged to extend downwardly and forwardly in the form of a finger or arm 15 for running below the surface of the soil in advance of the furrow opener 7.

For mounting the trash cleaner on the implement I propose extending the front ends of the brace bars 9 forwardly beyond the front end of the furrow opener 7, and spacing such forwardly projecting ends of the brace bars laterally with respect to each other to receive the coiled portion 14 of the trash cleaner. Referring to Figure 2, it will be seen that the forwardly extending portions of the brace bars are bent laterally to provide the desired spacing between their front ends for receiving the spring and its mounting means, such forwardly extending portions being designated 9'.

The inner convolution of the spring 14 is adapted to be non-rotatably anchored between the spaced arms 9'—9' through the instrumentality of the two mounting blocks 16. These mounting blocks are duplicates and, as shown in Figures 4 and 5, each comprises upper and lower flanges or lips 17, which embrace the upper and lower edges of the corresponding arm of the brace extension 9′ and thus serve to prevent rotation of the blocks. Formed on the inner sides of each of these blocks is a boss 18 in which is formed a vertically extending slot 19. When the two blocks are positioned between the spaced arm portions 9′, the slots 19 match one with the other and form a slot-like opening in which the inner convolution of the spring is rigidly clamped, as indicated at 21. Both blocks are provided with apertures 22 disposed at one side of the slots 19 for receiving a clamping bolt 23. The latter extends through aligned openings on the spaced arm portions 9′ and serves to clamp the arms, the mounting blocks, and the inner convolution of the spring in rigid engagement. The depth of the slots 19 is such that this clamping pressure is only effective on the inwardly turned end 21 of the spring, thus leaving the outer convolution of the spring free to flex for obtaining the vibrating action of the lower finger 15.

As previously remarked, the spring is constructed from flat bar stock. The lower finger portion 15 of the trash cleaner is subjected to bending stresses in passing through the soil and trash, and to reinforce such portion, I preferably shape or bend the side margins thereof backwardly so that the member 15 is of U-shaped cross section (Figure 6). The rounded or pointed contour thus given the member 15 facilitates the action of the same in cutting through the soil and deflecting the trash from the path of the furrow opener or runner. If desired, the soil engaging portion of the trash cleaner can be constructed as a short rigid bar suitably secured to the free end of the spring.

Owing to the fact that the planter runner 7 is often adjusted up and down to vary the depth of the seed furrow that it opens, it is also desirable that the trash cleaner be capable of vertical adjustment so that it can be set to run at the most effective depth in the soil with each adjustment of the runner. Such is provided for by forming an arcuate slot 25 in the front end of the runner through which passes the bolt 13. The slot is curved concentrically of the other bolt 12, and it will be evident that by loosening the nut on the bolt 13 the lower end of the brace 9 can be swung upwardly or downwardly around the center of the bolt 12 to raise or lower the end of the trash cleaner with respect to the ground level.

Having thus described my invention what I claim as new and desire to secure by Letters Patent of the United States, is:

1. In an implement of the class described, the combination of a furrow opener, a brace bar secured to the forward end of said furrow opener, and a trash cleaner mounted on said brace bar in front of said furrow opener, said trash cleaner comprising a coiled spring having one end connected with said brace bar and having its other end extending down into soil engaging position in advance of the furrow opener.

2. In a planter, the combination of a furrow opener, a brace bar secured to the front end of said furrow opener, and a trash cleaner mounted on said brace bar in front of said furrow opener, said trash cleaner comprising a spirally coiled spring having its inner end rigidly connected with said brace bar and its outer end extending down into soil engaging position in advance of the furrow opener.

4. In a planter, the combination of a furrow opener, two laterally spaced supporting arms secured to the front end of said furrow opener and projecting forwardly therefrom, and a trash cleaner consisting of a coiled spring mounted between said supporting arms and having one end extending down into soil engaging position in advance of the furrow opener.

4. In a planter, the combination of a furrow opener, a pair of brace bars secured to the front end of said furrow opener, and having their front ends projecting forwardly therefrom in laterally spaced relation, a trash cleaner consisting of a coiled spring mounted between the laterally spaced front ends of said brace bars, one end of said coiled spring extending down into the soil engaging position in advance of furrow opener, and means for non-rotatably clamping the other end of said spring between the front ends of said brace bars.

5. In a planter, the combination of a furrow opener, a pair of brace bars secured to the front end of said furrow opener and having their front ends projecting forwardly therefrom in laterally spaced relation, a trash cleaner consisting of a spirally coiled spring having its coil convolutions disposed between the laterally spaced front ends of said brace bars, the outer convolution of said spring extending down into soil engaging position in advance of the furrow opener, and means for non-rotatably securing the inner convolution of said spring between the front ends of said brace bars, said latter means comprising a bolt passing through said brace bars and spring.

6. In a planter, the combination of a furrow opener, a pair of brace bars secured to said furrow opener and projecting forwardly therefrom, a mounting block secured to the forwardly extending portion of said brace bars, and a trash cleaner consisting of a coiled spring having one end anchored to said mounting block and the other end extending down into the soil engaging position in advance of the furrow opener.

7. In a planter, the combination of a furrow opener, a pair of brace bars secured to the front end of said furrow opener, and having their front ends projecting forwardly therefrom in laterally spaced relation, a mounting block between the front ends of said brace bars, a bolt passing transversely through said mounting block and through said bars, and a trash cleaner comprising a spirally coiled spring having its inner convolution anchored to said block and its outer convolution extended down into soil engaging position in advance of the furrow opener.

8. In a planter, the combination of a frame, a furrow opener, two brace bars extending between said frame and the front portion of said furrow opener, the front ends of said brace bars extending forwardly beyond said furrow opener in laterally spaced relation, a block mounted between the front ends of the said brace bars, a shoulder on said block engaging a shoulder on one of said bars to prevent rotation of said block, and a trash cleaner consisting of a spirally coiled spring having its inner convolution anchored to said block and its outer convolution extending down into soil engaging position in advance of said furrow opener.

9. In a planter, the combination of a frame, a furrow opener, two brace bars extending between said frame and the front portion of said furrow opener, the front ends of said brace bars extending forwardly beyond said furrow opener in laterally spaced relation, a block mounted between the front ends of said brace bars, a bolt extending through said brace bars and said block, flanges on said block engaging the upper and lower edges of one of said bars to prevent the rotation of said block about the axis of said bolt, and a trash cleaner consisting of a spirally coiled spring having its inner end anchored to said block and its outer end extending down into soil engaging position in advance of the furrow opener.

10. In a planter, the combination of a frame, a runner for opening the seed furrow, two brace bars extending between said frame and the front end of said runner, the front ends of said brace bars extending forwardly beyond said runner in laterally spaced relation, a pair of blocks mounted between the front ends of said brace bars, flanges on each of said blocks engaging the upper and lower edges of the companion bars, a bolt extending through said bars and said blocks, the inner sides of said blocks having matching slots therein, and a trash cleaner consisting of a spirally coiled spring formed from flat stock, the inner convolution thereof being clamped between the matching slots of the said blocks, and the outer convolution thereof extending down into soil engaging position in advance of said runner.

11. In an implement of the class described, the combination of a furrow opener, a supporting member associated with said furrow opener, and a trash cleaner consisting of a spring coiled from flat stock, having one end secured to said supporting member and having its other end extending down into soil engaging position in advance of the furrow opener, the latter end of said spring being formed with a U-shaped cross section for reinforcing the same.

12. In a planter, the combination of a furrow opener, a brace bar at the front end of said furrow opener, a trash cleaner mounted on said brace bar in front of said furrow opener, said trash cleaner comprising a spirally coiled spring having its inner end rigidly connected with said brace bar and its outer end extending down into soil engaging position in advance of the furrow opener, and means for securing said trash cleaner in different height adjustments.

CHARLES H. WHITE.